April 3, 1956   A. A. SPACH   2,740,156
MACHINE FOR TAGGING LACES
Filed Jan. 22, 1952   4 Sheets-Sheet 1
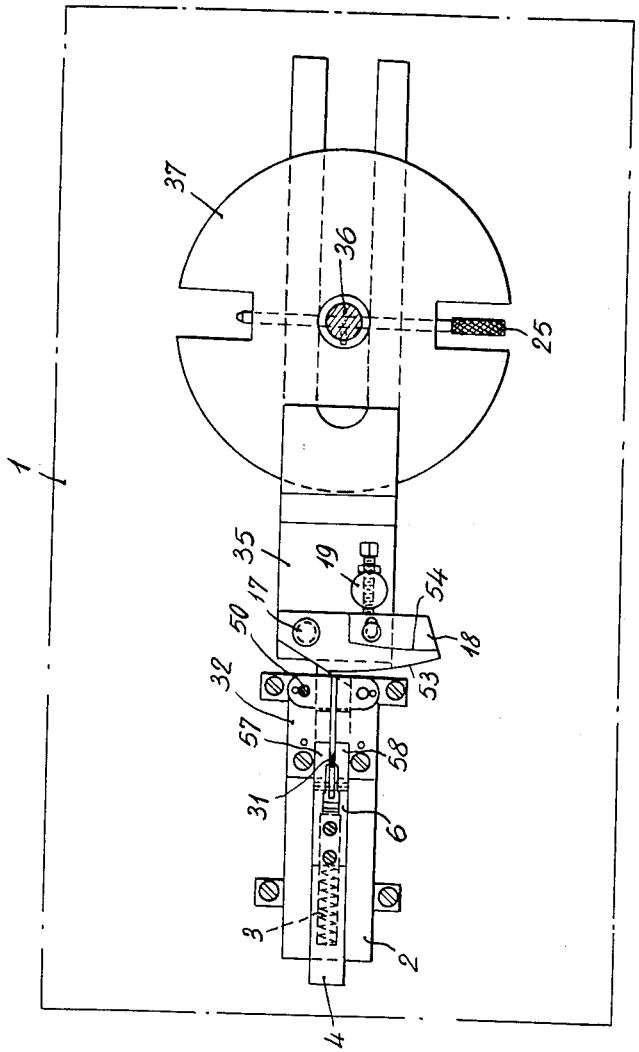
Inventor:
ANDRE ALBERT SPACH
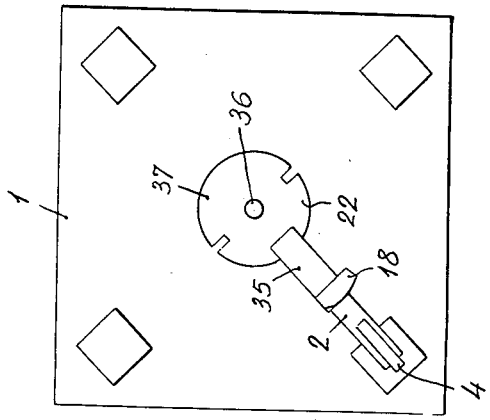
Attorney

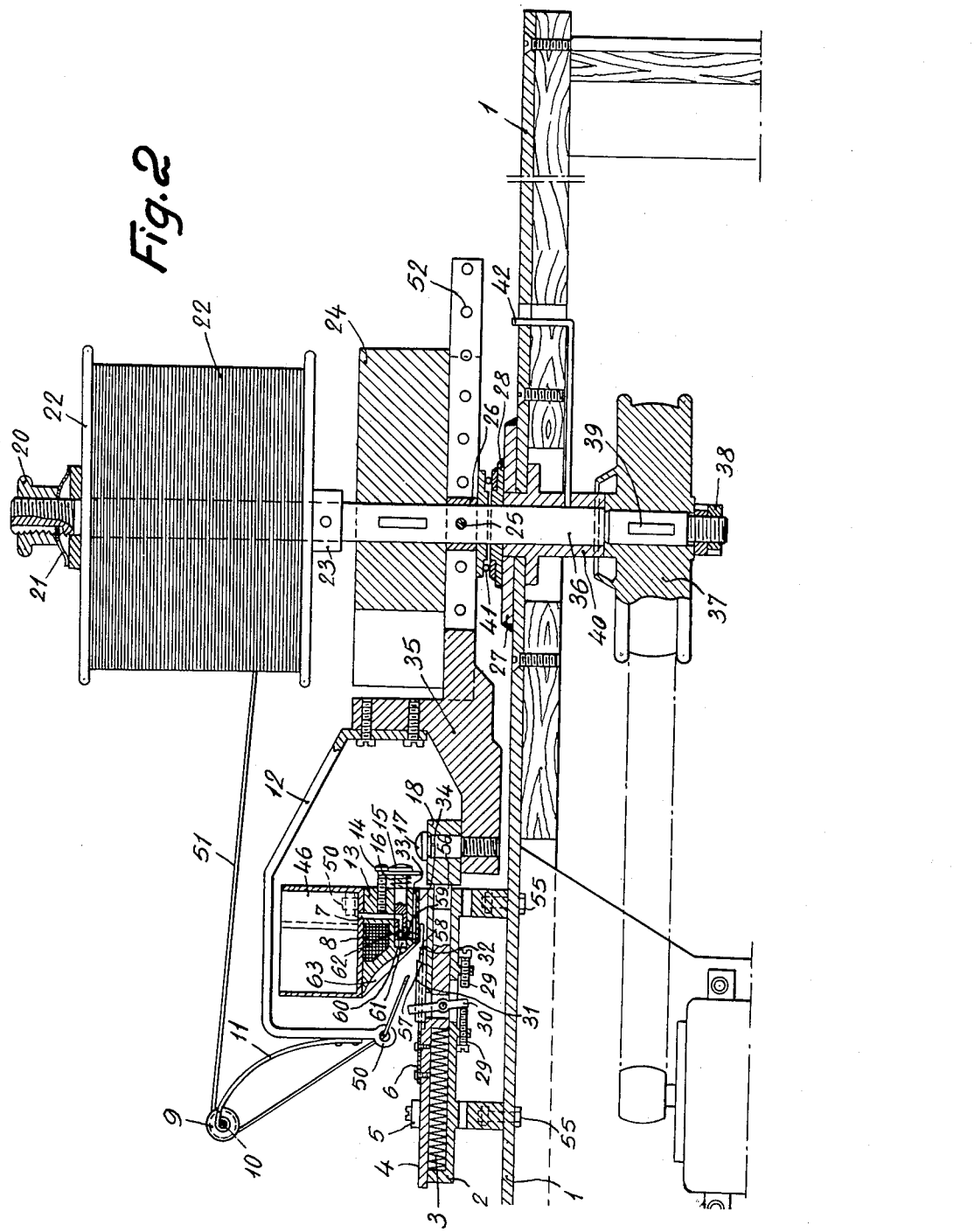

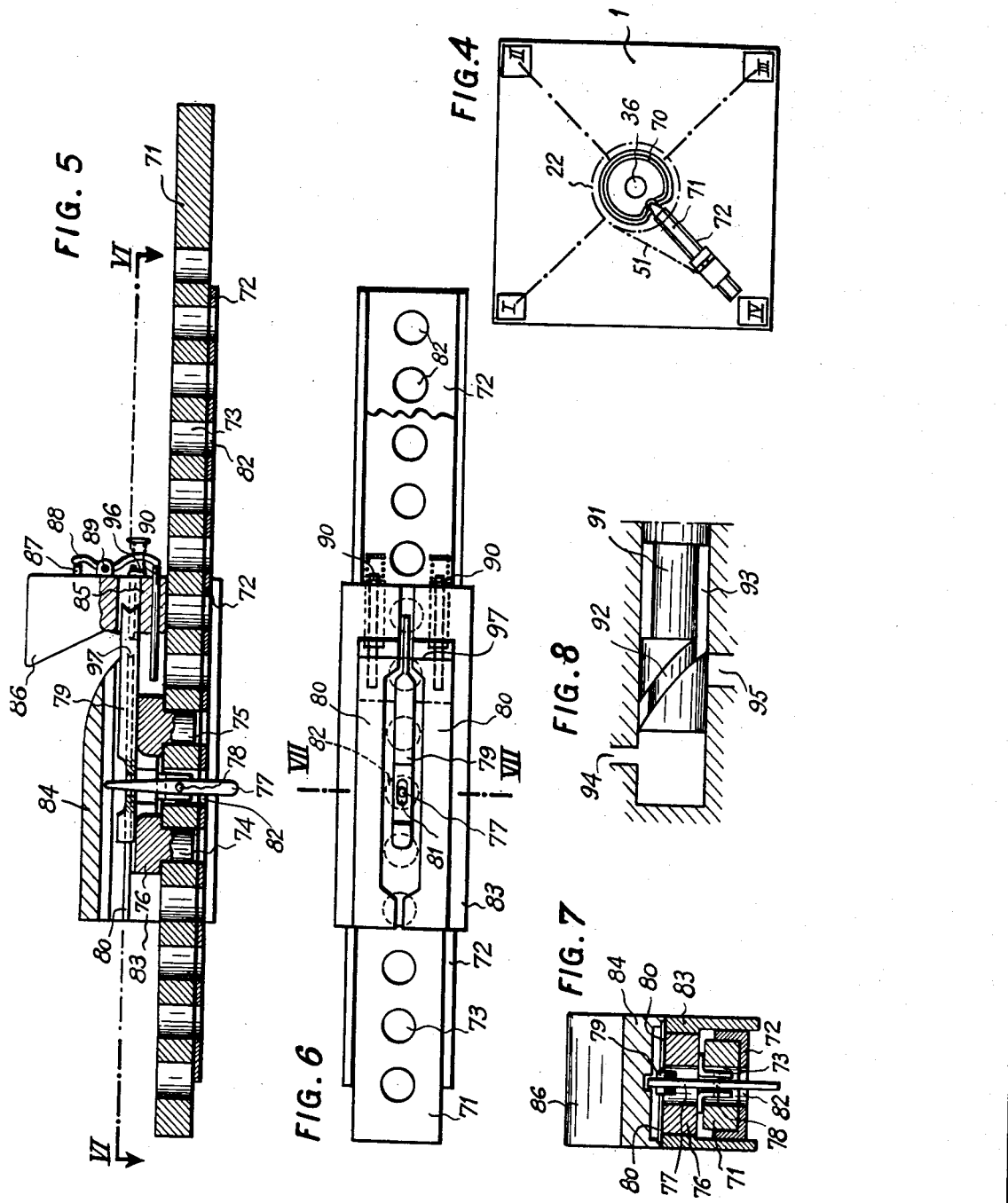

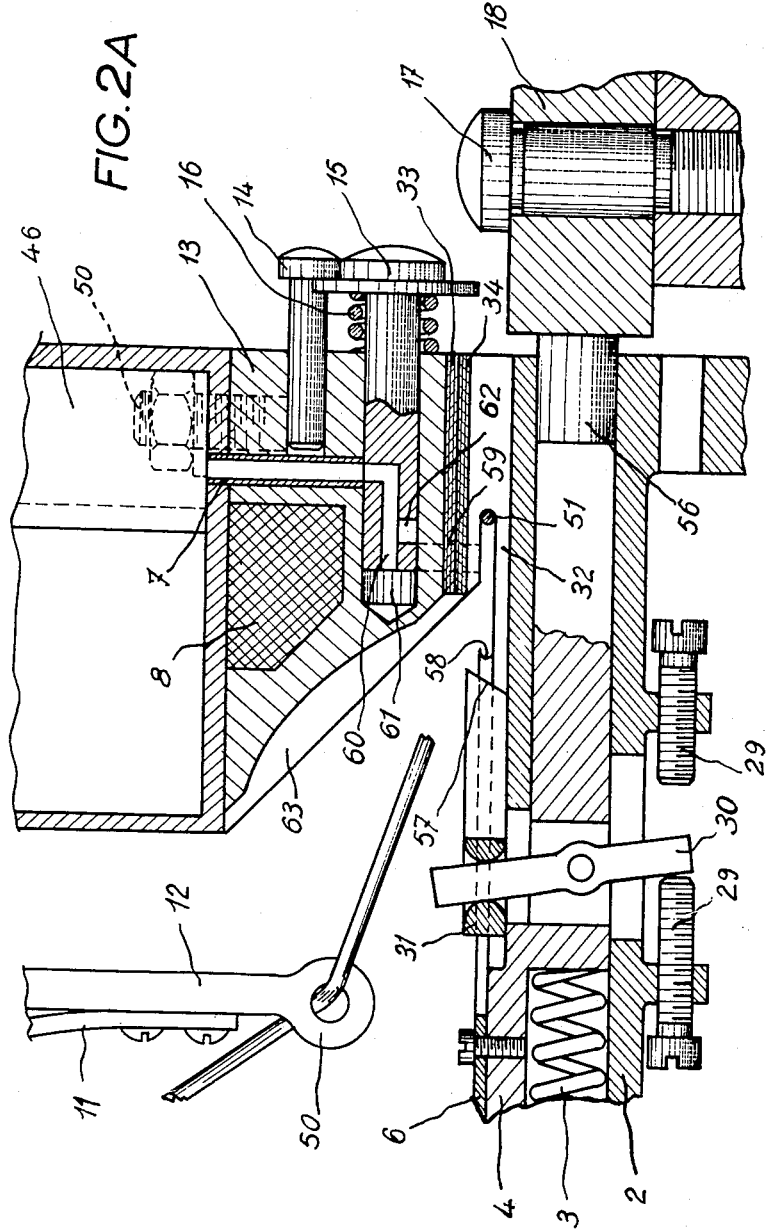

United States Patent Office 2,740,156
Patented Apr. 3, 1956

2,740,156

MACHINE FOR TAGGING LACES

André Albert Spach, Luxeuil-les-Bains, France

Application January 22, 1952, Serial No. 267,571

Claims priority, application France January 23, 1951

4 Claims. (Cl. 18—1)

This invention relates to machines for tipping or tagging laces. In order that laces may be passed through the eyes in footwear, the lace ends must be rigid. This rigidity has hitherto generally been obtained by tagging the ends with small metallic elements.

There now exists a tendency to substitute plastic material for metal, the said plastics material being applied in the form of strips which are welded either by heat or by impregnation.

The present invention has for its object to provide a machine by means of which it is possible to cover the lace ends with plastics material by moulding hot material on the lace.

It is also possible with this machine to produce laces of any required length, and to cut them to this length simultaneously with the moulding.

The new machine comprises in principle a number of identical stations disposed around the periphery of a table, at the centre of which there is provided a rotary vertical shaft carrying an arm which moves successively past each station and feeds thereto the lace which is unwound from a reel. The lace is deposited in a die at each station and receives an application of hot plastic material, which is compressed by a punch. The lace is then cut. A single cam driven by the central shaft engages with the various stations one after the other and sets in operation the injection pump for the plastics material and the knife.

In a modification, a cam is keyed on the central vertical shaft, and radially actuates sliding members, the movement of which drives all the necessary members at each station.

Mounted on each sliding member is a block, the position of which is regulatable in relation to the said sliding member. The block supports the movable part of the dies and the knife. The driving of the said block by the sliding member brings about the pivoting of a lever acting on the knife and moves push members which control the operation of the pump for the plastics material.

A constructional form of the invention is illustrated solely by way of example in the accompanying diagrammatic drawings, in which:

Figure 1 is a diagrammatic plan view of a machine made in accordance with the invention, Figure 2 is a vertical section on an enlarged view on a plane extending through the axis of the central shaft and through one of the stations, that is to say, diagonally along the table of the machine, Fig. 2A is a fragmentary sectional view showing a portion of Fig. 2, but on an enlarged scale, Fig. 3 is a partial plan view with the container for the molten plastic and associated slide valve omitted corresponding thereto but on a smaller scale, showing one of the stations, Figures 4 to 8 relate to a modified form of a machine according to the invention, Figure 4 is a plan view showing diagrammatically the whole of the modified machine, Figure 5 is a vertical section through the control mechanism on a larger scale, Figure 6 is a horizontal section on the line VI—VI on Figure 5, Figure 7 is a transverse section along the line VII—VII on Figure 6, and Figure 8 is a view of a detail.

Referring initially to the embodiments of the invention illustrated in Figs. 1 to 3, it will be seen that Fig. 1 shows a plan view diagrammatically representing the general arrangement of the device which comprises a table 1, having four tagging stations disposed at the four corners thereof, that is, along diagonal lines intersecting at the center of the table. A vertical shaft 36 is mounted at the center of the table in a bearing 40 for rotation by suitable means, such as, a motor driven pulley 37 (Fig. 2) secured by a key 39 to the shaft. Secured to shaft 36 above table 1 and rotatable with the shaft is a plate 24 mounted above a bifurcated extension of a projecting arm or bracket 35. The legs of the bifurcated extension of bracket 35 are provided with a series of spaced apart holes 52 through which a spindle 25 having a knurled head passes to secure the brackets 35 to shaft 36 at any selected position along the length of the bifurcated extension. As shown in Fig. 3, the knurled spindle 25 is preferably accommodate within a recessed portion of plate 24.

Mounted at the upper end of shaft 36, and rotatable with respect to the latter, is a spool 22 carrying the lace 51 and surmounted by a spring 21 for braking the unwinding of the spool 22, with a knot 20 being screw-threaded on the upper end of shaft 36 to vary the braking effect of spring 21.

The bifurcated extension of bracket 35 preferably rests upon ball bearings 41 to reduce the frictional resistance to rotation of the bracket with shaft 36. As shown in Fig. 2, arm 35 extends radially from the axis of shaft 36 and includes an upright portion to which is attached a radially, outwardly extending bracket member 12 terminating in a downwardly bent portion having an eye 50. Secured to the outer end of the bracket 12 is an arm 11 which rotatably supports a pulley 9 on a pin 10. As shown in Fig. 2, the lace 51 passes from spool 22 over the pulley 9 and then through the eye 50. The lower outer portion of arm 35 supports a cam member 18 having two superposed cam surfaces 53 and 54 (Fig. 3) at different vertical positions or levels. The upper cam surface 54 has been omitted from Figs. 2 and 2A in order to more clearly disclose the structure at the inner end of the tagging station cooperating with the two cam surfaces.

Each tagging station, shown in detail in Figs. 2, 2A and 3, comprises a radially or diagonally disposed supporting member 2 which is channeled along its length for receiving, in the rear or radially outer portion thereof, a coil spring 3, and, in the forward or radially inner portion thereof, the forward portion of a sliding member 4 which is constructed to slide over the rear portion of support 2 and within the forward part of the same support. Mounted on member 2, above the sliding member 4, there is provided a body 13 defining a fixed die portion 32 opening radially outward and supporting a container 46 for storing and melting a suitable thermoplastic material therein. Electrical heating means is provided in body 13 adjacent container 46 for melting the plastic within the latter. A vertical outlet 7 leads from the bottom of the container to a horizontal bore in body 13 accommodating a slide valve 15. Slide valve 15 has an L-shaped passage 16 therein opening upwardly and at the inner end of the slide valve. Passage 60 is disposed so that, when the slide valve 15 is disposed or positioned in a radially inward location, that is, to the right as viewed in Fig. 2A, the upwardly opening end of passage 60 registers with the vertical outlet 7 of body 13. The slide valve is also formed with a downwardly opening port 62 extending from passage 60 and registering with a corresponding port 59 in the member 13 when the slide valve is displaced radially outward, that is, to the left, from the position shown in Fig. 2A. A stop bolt 14 is carried by body 13 so that the head thereof is engageable with a rim at the inner end of slide valve 15, as shown in Fig. 2A thereby to limit the inward movement of the slide valve to a position in which passage 60 registers with outlet 7. A spring 16 coacts with the slide valve 15 to urge the latter radially inward against the stop 14. It is apparent, that when the slide valve is disposed in its radially inward position, molten plastic flows from the container 46 through outlet 7 and passage 60 into the outer end of the bore accommodating the slide valve which provides a pocket 61 for accommodating a predetermined quantity of the molten plastic. When the slide valve is stroked radially outward against the action of spring 16, passage 60 is moved out of registration with outlet 7, and the molten plastic is pumped out of pocket 61 and through passage 60 and port 62 into port 59, which then registers with port 62, so that the plastic is deposited or discharged from port 59 on to the fixed die portion 32.

Radially outward movement of slide valve 15, that is to the left as viewed in Figs. 2 and 2A, is effected by contact of the upper cam surface 54 (Fig. 3) with the inner end or head of the slide valve as bracket 35, and cam 18, are rotated about the axis of shaft 36. When the cam surface 54 has been moved out of contact with the inner end or head of slide valve 15, spring 16 is then effective to return the slide valve to its radially inward position wherein a new charge of molten plastic is fed into the pocket 61 through the outlet 7 and the passage 60 aligned with the latter.

As seen in detail in Fig. 2A, the supporting member 2 extends over the top of the forward portion of sliding member 4, and a cutting knife 57 is longitudinally slidable on top of member 2 and forms a forward projection of a movable sliding member 31. A lever 30 is pivoted intermediate its ends on the sliding member 4, and is received in a suitable opening in the member 4, with the upper end of lever 30 being received in an opening in the member 31 while the lower ends of lever 30 project downwardly between two adjustable abutment screws 29 carried by supporting member 2. Thus, when sliding member 4 is moved radially inward, by the action of spring 3, lever 30 is free to rock to permit knife 57 to lag behind the movement of member 4 until such time as the lower end of lever 30 contacts the inner one of the screws 29, whereupon, lever 30 is rocked clockwise, as viewed in Fig. 2A, to stroke the knife radially inward into the outwardly opening fixed die portion 32. The knife 57 is laterally centralized on top of the support member 2, and fixed on top of sliding member 4 is a movable die forming member 6 having spaced apart extensions at the opposite side of knife 57 which terminate at their inner ends in movable die portions 58. Thus, as the sliding member 4 moves radially inward from the position illustrated in Fig. 2A, the movable die forming member 6 until the movable die portions 58 cooperate with the fixed die portion 32 to define a substantially cylindrical mold cavity. After the movable die portions 58 have been closed on to the thick die portion 32, knife blade 57 is then stroked radially inward through the center of the mold cavity.

Radially outward movement of sliding member 4 is effected by contact of the cam surface 53 of cam 18 with a cam follower 56 extending from the radially inner end of the sliding member 4. The cam surface 53 is effective to displace the sliding member 4 to the radially outward position illustrated in Figs. 2 and 2A, wherein the movable die portions 58, at the opposite side of knife blade 57 are spaced radially outward from the fixed die portions 32, while the lower end of lever 30 engages the outer screw 29 and is rocked by the latter to a position wherein the knife edge is disposed radially outward with respect to the movable die portions 58.

In operating the above described embodiment of the invention, the free end of the lace 51 is initially laid across the fixed die portion 32 at the tagging station having the follower 56 of the sliding member 4 thereof contacted by the cam surface 53, so that the die is open and the knife 57 is radially retracted. Rotation of shaft 36 is then commenced, in the clockwise direction as viewed in Fig. 3, and contact of cam surface 54 with the inner end of slide valve 15 then causes the deposit of a predetermined amount of molten plastic in the open die around the lace placed in the latter. As cam surfaces 53 and 54 move out of contact with the follower 56 and slide valve 15, respectively, port 62 of the slide valve moves out of registry with port 59, thereby to interrupt the supplying of the plastic, and the movable die portions 58 are displaced radially inward to close the die and to shape the molten plastic around the lace disposed in the die. Final radially inward movement of sliding member 4, by the action of spring 3, is accompanied by radially inward movement of blade 57 which thereby enters the closed die and cuts across the plastic encased lace at the center of the die. Since the movable die portions 58 are moved radially outward to open the die, only when the cam surface 53 contacts cam follower 56 sliding member 4 and since only a single cam member 18 is provided on the device, it is apparent that the die will not be opened, following the closing thereof, until the bracket 35 has completed a revolution of 360° about the axis of shaft 36 and returns to a position in radial alignment with the related station. Thus, the severed lace having a coating of plastic on the abutting ends thereof will be held in the closed die for a complete revolution of the bracket 35.

As seen in Figs. 2 and 2A, the body 13 at each tagging station has an outer surface which is inclined downwardly and radially inward so that as the lace is drawn off spool 22 and wound around the successive stations, by rotation of bracket 12 with bracket 35, the lace contacts the inclined outer surface 63 and is directed by the latter into the open die. Since the bracket 12 is in radial alignment with the cam 18 carried by the bracket 35, it is apparent that the die will be in its opened condition at the time when bracket 12 and eye 50 operate to dispose the lace in the die at the related tagging stations. Thus, when the bracket 35 completes a full revolution and returns to the original tagging station, the die is opened, and the severed and plastic coated ends of the lace are removed from the open die by the operator of the machine thereby to condition the open die for the reception of the lace being deposited therein by the bracket 12 and the eye 50. From the foregoing, it is apparent that the described machine operates to cut the continuous lace 51 into sections corresponding in length to the distances between the successive tagging stations and to deposit plastic coatings on the ends of such sections of the lace at each of the tagging stations.

In the arrangement shown in Figures 4 to 8, four stations I, II, III and IV are provided on the Table 1 (Figure 4).

The vertical shaft 36 carries the reel 22 with its arms for the distribution of the lace 51. These members are the same as those hereinbefore described with reference to Figs. 1 to 3 and are not being shown in Figs. 4 to 8.

Mounted on the said shaft is a central cam 70 which controls one sliding member 71 for each station, for example by means of a groove and a roller. The said sliding member moves in a fixed guide 72.

The sliding member is formed with evenly spaced holes 73 in which two studs 74, 75 on a block 76 become engaged. The central portion of the said block is recessed to permit the movement of a lever 77 pivoted at 78 and intended to actuate the knife 79. Fixed on the said block 76 are two rather thick plates 80 forming the movable parts or punches of the die in which the ends of the lace are to be moulded.

The upper end of the lever 77 is freely engaged in an eye 81 in the knife 79, while its lower end is engaged in one of the holes 82 in the guide 72. The said holes 82 are spaced apart by the same distance as the holes 73 in the sliding member 71 (Figures 5 and 6).

The essential functions of the knife 79 are, on the one hand, to cut the laces before they have reached the end of the tagging die in order that their ends may be entirely coated by the plastic material, and on the other hand, to ensure that that end of the mould in which the tags are formed is closed. To this end, there may be formed in the side walls thereof a spherical recess or the like which, at the end of the stroke, lies in the extension of the mould so that the ends of the laces formed therein are rounded.

The lever 77 is intended to lengthen the stroke of the knife 79, so that the said knife is completely retracted when the die is in the open position, in order to enable the laces to be introduced, and to ensure that the same knife has advanced sufficiently to permit the closing of the mould.

The knife may be divided with a stop which exactly determines its position in relation to the injection mould when the die is closed, and to ensure that the lever 77 is not subjected to excessive forces, one of the edges of the holes 82 in the guide 72 (the one situated near the centre of the machine) may be lined with an elastic coating (of rubber, steel or the like) so that the knife 79 can abut against its stop, while the movement of the punch 76—80 continues until the die is completely closed.

The blocks 76 are enclosed in a fixed casing 83, the position of which can be adjusted in relation to the fixed guide 72. A cover 84 permitting access to the interior when required is provided.

The said casing supports the fixed part 85 of the die, above which is situated the pump 86 for the plastic material. The pistons 87 of the pump are controlled by rocking levers 88 pivoted at 89, which are actuated by push members 90, which may be subjected to the action of the block 76.

In order to regulate the quantity of plastic material injected, the pistons 91 have in the known manner a helical groove 92 (Figure 8) leading to a recess 93. When the piston is turned on itself, the stroke necessary to place the feed conduit 94 in communication with the outlet conduit 95 for the material is modified, whereby the regulation is effected.

Spring-loaded gripping members 96 serve to maintain the lace during and after the stroke. The ends of the said gripping members are opposite the projections or punches 97 of the movable parts of the die. The lace is deposited between the ends of the gripping members and the projections 97. Consequently, when the block 76 advances to the right, the lace is gripped between the said punches 97 and the gripping members.

The said gripping members also serve, when the die opens for a further operation, to maintain the lace in the die until it is removed by the ejector.

By inclining the grooves in which they are lodged, the two cut lace lengths can also be readily spaced slightly apart so that each of them can be completely coated by the plastic material.

The operation is as follows:

At the end of one operation, the sliding member 71 is moved away from the centre of the machine. The block 76 occupies the position shown in Figure 5 so that the die is open, the knife 79 occupying its rear position. In turning, the lace-distributing arm can deposit the lace in the opening of the die.

The central cam 70 then returns the sliding member 71 to the centre, and the die commences to close.

The block 76 moves to the right (Figure 5) and the lower end of the lever 79 abuts against the edge of the hole 82 in the guide, in which it is engaged. The lever therefore pivots, and the knife advances to the right under the action of the lever 77.

Before the knife makes the cut, the forward parts of the male die grip the lace between them and the spring-loaded gripping members 96 on either side of the part to be cut.

The knife makes the cut. The two lengths of the lace are retained by the gripping members 96, being situated at a small distance from the ends of the die.

At the instant when the die closes, the blocks 76 bears against the push members 90 and the levers 88 rock and actuate the pistons of the pump for the plastic material, which inject the hot material on to the ends of the lace.

The die then remains closed for a large part of the rotation of the shaft, so that the material has time to solidify.

When the die opens, the tagged lace is withdrawn by hand or removed by means of a mechanical injector.

The length of the lace is adjusted by adjusting the position of the block 76 on the sliding member 71.

The constructional form of the machine hereinbefore described may be modified in various ways.

The invention affords the following essential advantages:

The lace is unwound around the dies by a continuous rotational movement. The tension to which it is subjected by the unwinding system causes it to penetrate automatically into the interior of each die.

From the instant when the lace has penetrated into the die, the various functions are performed, but the lace cannot leave the die until the dies are opened again because, even when it is cut, it is held either by the gripping members 96 or by the die itself, i. e., the male and female parts thereof.

There is thus available between two successive openings of the dies a lace stretched between two points, and it is very simple to regulate a system of gripping members outside the dies in order to take it up for another use.

The material employed for the "tagging" may be any suitable plastic material or any natural or synthetic resin.

The arrangements hereinbefore described are referred to only by way of example, and all the constructional details, forms, dimensions and materials employed may vary in all cases without departing from the principle of the invention.

I claim:

1. A machine for tagging or tipping laces which comprises a series of tagging stations radially disposed about a rotating member, a supply of continuous lace rotatably mounted on said member, means for extending said lace between said stations successively, and means at each station for automatically severing the continuous lace into sections and tagging the ends of the severed lace sections with thermoplastic material, said means at each station including a supply of molten thermoplastic, means for depositing a measured amount of said thermoplastic on the portion of said lace at the related station and severing and compressing means responsive to the rotation of said rotary member for severing said portion of the lace and for retaining the severed ends at said station during the course of one revolution of said rotary member.

2. A machine as claimed in claim 1 wherein said rotary member comprises a projecting arm, a double cam mounted on said arm and arranged to cooperate with said plastic supply means and said severing and compressing means at each station successively.

3. A machine as claimed in claim 1 wherein said severing and compressing means at each station includes a fixed die portion for receiving said portion of the lace therein, a sliding movable die portion normally held against said fixed die portion for molding the thermoplastic about the lace within the die, said movable die portion means being retractible to open said die, a slidable severing blade movable across the die to sever the lace and molded thermoplastic in the die, and spring means for urging said movable die portion against the fixed die portion and for the moving the blade across the die.

4. A machine as claimed in claim 3 comprising a cam member mounted for rotation about said rotating member and for retracting said movable die portions and blade at each of the successive stations.

References Cited in the file of this patent
UNITED STATES PATENTS

| | | |
|---|---|---|
| 1,594,971 | Matson | Aug. 3, 1926 |
| 1,807,886 | Armitage | June 2, 1931 |
| 1,888,429 | Matson | Nov. 22, 1932 |
| 2,012,905 | Chace | Aug. 27, 1935 |